United States Patent
Vineyard et al.

(10) Patent No.: US 11,361,111 B2
(45) Date of Patent: *Jun. 14, 2022

(54) REPETITIVE SIDE CHANNEL ATTACK COUNTERMEASURES

(71) Applicant: Arm Limited, Cambridge (GB)

(72) Inventors: Carl Wayne Vineyard, Leander, TX (US); Christopher Neal Hinds, Austin, TX (US); Adeline-Fleur Fleming, Duxford (GB)

(73) Assignee: ARM LIMITED, Cambridge (GB)

( * ) Notice: Subject to any disclaimer, the term of this patent is extended or adjusted under 35 U.S.C. 154(b) by 285 days.

This patent is subject to a terminal disclaimer.

(21) Appl. No.: 16/030,459

(22) Filed: Jul. 9, 2018

(65) Prior Publication Data

US 2020/0012822 A1 Jan. 9, 2020

(51) Int. Cl.
*G06F 21/77* (2013.01)
*G06F 21/56* (2013.01)
*G06F 21/72* (2013.01)

(52) U.S. Cl.
CPC ............ *G06F 21/77* (2013.01); *G06F 21/567* (2013.01); *G06F 21/72* (2013.01); *G06F 2221/034* (2013.01)

(58) Field of Classification Search
CPC ......... G06F 21/72; G06F 21/77; G06F 21/567
USPC .......................................................... 726/23
See application file for complete search history.

(56) References Cited

U.S. PATENT DOCUMENTS

| 3,887,911 A | 6/1975 | Bell | |
| 3,989,034 A * | 11/1976 | Hojaiban | A61B 5/024 600/511 |
| 4,066,964 A * | 1/1978 | Costanza | H04B 7/24 340/7.42 |

(Continued)

FOREIGN PATENT DOCUMENTS

| EP | 2009864 A1 | 12/2008 |
| EP | 3040901 A1 | 7/2016 |

OTHER PUBLICATIONS

Smart Card Alliance, "What Makes a Smart Card Secure?," A Smart Card Alliance Contactless and Mobile Payments Council White Paper, https://www.securetechalliance.org/publications-smart-card-security/, Published in Oct. 2008, 37 pages.

(Continued)

*Primary Examiner* — Dant B Shaifer Harriman
(74) *Attorney, Agent, or Firm* — Talem IP Law, LLP (57) ABSTRACT

A computing device incorporating repetitive side channel attack (SCA) countermeasures can include a timer circuit and a capacitive delay circuit that notifies of a potential repetitive-based attack by sending an activity-detected signal that can be used to initiate an appropriate countermeasure response. Additionally, or independently, a computing device incorporating repetitive SCA countermeasures can include at least one storage unit that can store an incoming input signal, at least one comparator to compare the incoming input signal with another signal and indicate a match, and a counter that increments upon the match. When the counter reaches a specified limit, a limit-exceeded signal can be sent to notify of a potential repetitive-based attack and initiate an appropriate countermeasure response.

14 Claims, 7 Drawing Sheets

(56) References Cited

U.S. PATENT DOCUMENTS

| | | | |
|---|---|---|---|
| 4,187,399 A * | 2/1980 | Maxfield | H04Q 11/0407 |
| | | | 370/364 |
| 4,204,256 A | 5/1980 | Klötzner | |
| 4,710,865 A | 12/1987 | Higomura | |
| 4,789,925 A * | 12/1988 | Lahti | G06F 9/3824 |
| | | | 708/441 |
| 4,907,845 A * | 3/1990 | Wood | A61B 5/1115 |
| | | | 200/85 R |
| 5,148,171 A | 9/1992 | Blumberg | |
| 5,218,707 A * | 6/1993 | Little | G06F 13/4072 |
| | | | 712/39 |
| 5,996,081 A * | 11/1999 | Shim | G06F 1/3203 |
| | | | 713/320 |
| 6,073,236 A * | 6/2000 | Kusakabe | G06Q 20/40975 |
| | | | 713/169 |
| 6,289,455 B1 | 9/2001 | Kocher et al. | |
| 7,120,220 B2 | 10/2006 | Du et al. | |
| 7,421,552 B2 | 9/2008 | Long | |
| 8,031,521 B1 | 10/2011 | Yang | |
| 8,559,576 B2 * | 10/2013 | Ono | H04L 7/02 |
| | | | 375/354 |
| 8,688,862 B1 | 4/2014 | Alley | |
| 8,762,656 B2 | 6/2014 | Confalonieri et al. | |
| 9,454,424 B2 | 9/2016 | Von Wendorff | |
| 2010/0001777 A1 | 1/2010 | Brantley et al. | |
| 2010/0332851 A1 | 12/2010 | Priel et al. | |
| 2011/0085379 A1 * | 4/2011 | Kim | G11C 16/0483 |
| | | | 365/185.03 |
| 2011/0145595 A1 | 6/2011 | Kim et al. | |
| 2012/0284533 A1 * | 11/2012 | Assche | H04L 9/002 |
| | | | 713/192 |
| 2016/0117219 A1 | 4/2016 | Halbert et al. | |
| 2016/0371161 A1 | 12/2016 | Louie et al. | |
| 2017/0060681 A1 | 3/2017 | Halbert et al. | |
| 2017/0075812 A1 | 3/2017 | Wu et al. | |
| 2017/0177262 A1 | 6/2017 | Sharma et al. | |
| 2018/0175864 A1 | 6/2018 | Walrant et al. | |
| 2019/0042739 A1 * | 2/2019 | Browne | G06F 21/554 |

OTHER PUBLICATIONS

International Search Report and Written Opinion Issued in International Application No. PCT/GB2019/051872, dated Aug. 6, 2019, 13 pages.

Office Action Issued in U.S. Appl. No. 16/409,205, dated Dec. 24, 2020, 42 Pages.

Non-Final Office Action Issued in U.S. Appl. No. 16/409,314, dated Jan. 29, 2021, 25 Pages.

Corrected Notice of Allowability issued in U.S. Appl. No. 16/409,314, dated Oct. 6, 2021, 8 pages.

Notice of Allowance issued in U.S. Appl. No. 16/409,205, dated Sep. 10, 2021, 20 pages.

* cited by examiner

REPETITIVE SIDE CHANNEL ATTACK COUNTERMEASURES

BACKGROUND

Smart cards are portable, personal security computing devices that can securely carry sensitive information, enable secure transactions, validate an individual's identity within a secure system, and verify that an information requestor is authorized to access the information carried on the card. Smart cards are configured to maintain the integrity of the information stored on the card, as well as make the information available for secure interactions with an overall system.

Side channel attacks (SCAs) refer to a set of attack techniques that may be used to compromise the security of a smart card or other computing device. SCAs generally include attacks based on information gained from the physical implementation of a cryptosystem, including timing information, power consumption, electromagnetic leaks, and sound. Repetitive SCAs involve repetitive activity with respect to applying an input signal in order to capture information from, for example, the power pins or signal lines of the smart card.

Countermeasures against SCAs may include detection components and response components. A detection component includes hardware and/or software that determines a possible attack is occurring (e.g., which may be a binary determination of attack conditions being tripped or a determination with probabilities providing confidence values). A response component includes hardware and/or software that performs an action in response to a detection component indicating that the attack is occurring (with or without a certain level of confidence). The response component may be a switch that resets or shuts down the cryptography engine, or even more complex circuitry that changes characteristics of the device, as some examples.

BRIEF SUMMARY

Repetitive SCA countermeasures for computing devices are described herein. The described countermeasures are suitable for protecting against side channel attacks as the repetitive behavior of the attack is occurring.

A computing device incorporating repetitive side channel attack (SCA) countermeasures can include a timer circuit and a capacitive delay circuit that notifies of a potential repetitive-based attack by sending an activity-detected signal that can be used, for example, to reset a computation engine or perform another appropriate countermeasure response.

The timer circuit can receive a clock signal and a reset signal of the computing device and outputs a timer-on notification to a computation engine of the computing device circuit and a delay-capture signal to the capacitive delay circuit. The capacitive delay circuit can be configured to output an activity-detected signal in response to the computing device having power or reset applied within a specified amount of time after a prior application of power or reset. In some cases, the activity-detected signal can be output when the computing device is powered for an amount of time that is shorter than would be for a typical operation. The capacitive delay circuit can include a capacitor, an amplifier, and a latch or flip-flop gate. The capacitor can be coupled between power (VDD) and ground (VSS or GND) of the computing device. The amplifier can be coupled to the capacitor to sense the charge on the capacitor and output the signal to the latch or flip-flop gate. The latch or flip-flop gate receives the delay-capture signal from the timer circuit to output an activity-detected signal to the computation engine when both the delay capture signal is output as a clock from the timer circuit is on and the signal from the amplifier has a high enough value.

A computing device incorporating repetitive SCA countermeasures can include at least one storage unit that can store an incoming input signal to a computation engine of the computing device, at least one comparator to compare a next incoming input signal with a prior incoming signal stored in the storage unit and indicate a match, and a counter that increments upon the match. When the counter reaches a specified limit, a limit-exceeded signal can be sent to notify of a potential repetitive-based attack and initiate an appropriate countermeasure response.

In some cases, multiple comparators and storage units can be provided so that a sequence of input signals can be analyzed for repetitive signals. One or more counters may be coupled to the multiple comparators.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Repetitive side channel attack (SCA) countermeasures for computing devices are described herein. The described countermeasures are suitable for protecting against side channel attacks as the repetitive behavior of the attack is occurring. An example of a computing device is a cryptography engine, which may be implemented as part of a smart card.

In one repetitive side channel attack scenario, a smart card is applied with different signals with a reset in between. A smart card (or other computing device subject to such a side channel attack scenario) incorporating repetitive SCA countermeasures can include a timer circuit and a capacitive delay circuit that notifies of a potential repetitive-based attack by sending an activity-detected signal that can be used to initiate an appropriate countermeasure response. For example, the activity-detected signal may be used to reset a cryptography engine of a smart card or perform another appropriate countermeasure response when the smart card is powered for an amount of time that is shorter than what would be for typical operation or in response to the smart card having power or reset applied within a specified amount of time after a prior application of power or reset.

In another repetitive side channel attack scenario, a smart card is applied with the same input signal over and over again. A smart card (or other computing device subject to such a side channel attack scenario) incorporating repetitive SCA countermeasures can include at least one storage unit that can store an incoming input signal, at least one comparator to compare a next incoming input signal with a prior incoming signal stored in the storage unit and indicate a match, and a counter that increments upon the match. When the counter reaches a specified limit, a limit-exceeded signal can be sent to notify of a potential repetitive-based attack and initiate an appropriate countermeasure response.

Figure 1A:
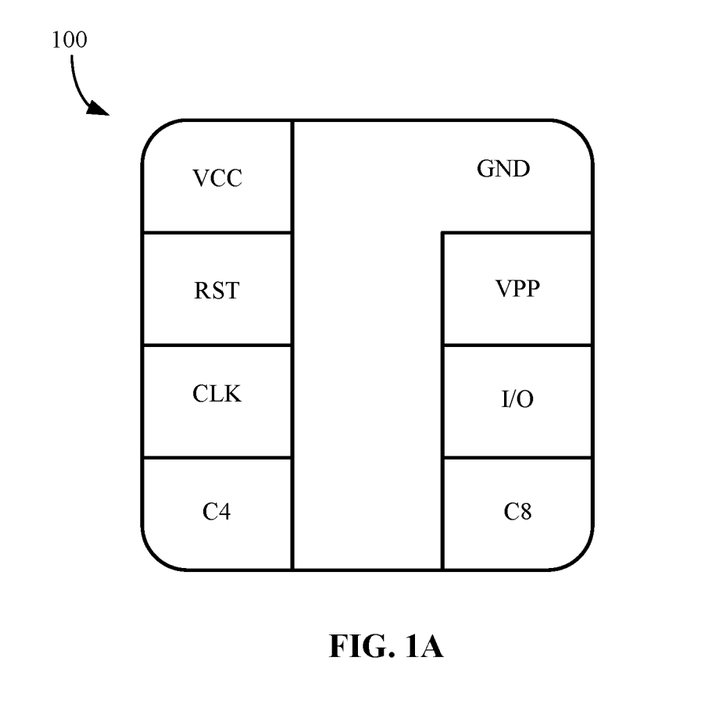
FIG. 1A shows an illustrative smart card pinout for a smart card chip that can include any of the hardware countermeasures described herein.
Figure 1B:
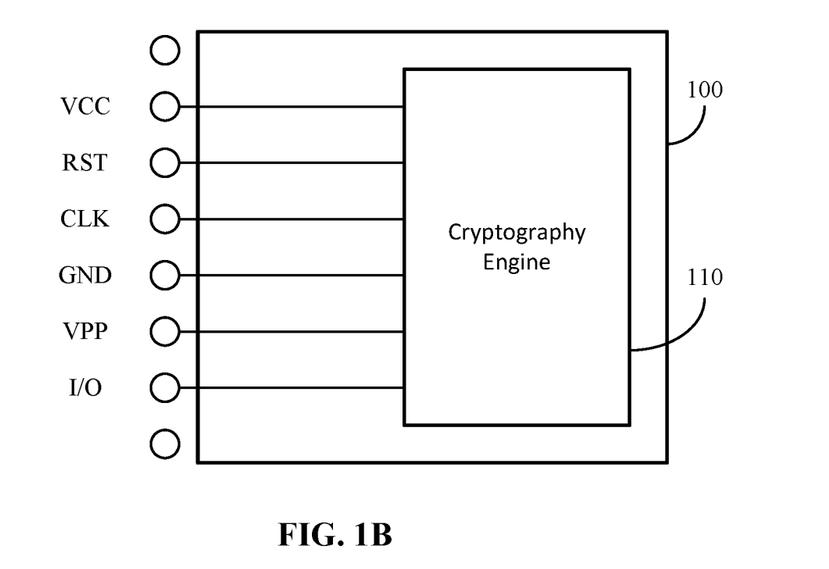
FIG. 1B provides a representational diagram of a smart card.

FIG. 1A shows an illustrative smart card pinout for a smart card chip that can include any of the hardware countermeasures described herein; and FIG. 1B provides a representational diagram of a smart card chip. A smart card chip 100 includes circuitry and packaging. Presently, standard smart card chip packaging provides a 6 pin or 8 pin bus pinout. As shown in FIG. 1A, packaging for a smart card chip 100 can include pads for VCC (power supply input), RST (can be used by itself or in combination with an internal reset control circuit), CLK (clocking or timing signal), GND (ground—a ground or VSS signal), VPP (programming voltage input), and I/O (input or output for serial data to the microcontroller inside the smart card). Two additional connection pads (e.g., C4 and C8) can be included for application specific inputs (or outputs) or future standards. The pads are coupled to the smart card chip circuitry, including a cryptographic engine block 110. Although only a cryptographic engine block 110 is illustrated in FIG. 1B, a smart card chip 100 can include a plurality of different circuit blocks and sub-blocks, including, but not limited to, a processor, memory, analog circuitry, and interface circuitry, in addition to the cryptographic engine block 110. Furthermore, any one or combination of countermeasures described herein can be included as part of smart card chip 100.

The data input signal to the smart card for a transaction (and provided to the cryptography engine 110 via I/O pin) is referred to herein as an information cycle. An information cycle can include, but is not limited to, an input signal formed of digital bits, analog waveforms, or mixed signal data. In many cases, the information cycle uses plain text or cipher text.

During normal operation of smart card chip 100, the smart card in which chip 100 is embedded may be inserted into a contact-based reader or placed in a position for wireless reader connectivity. There is generally an expectation that a reasonable period of time occurs between transactions using the smart card. For example, there is a certain amount of time it takes to ring up a purchase, slide a card into a reader, enter a pin, and complete the transaction; and then go to another store or ring up another purchase at the same store, slide the card into the reader, enter the pin, and complete that other purchase.

In normal use of a smart card, such as during a credit/debit card transaction, the owner of the smart card may initiate a transaction at one store and then initiate another transaction at a different store several minutes later (or longer). There is a reasonable time lapse between each iteration of running the instructions in the process, and the information cycle may be different with each iteration.

In contrast to normal use of a smart card, repetitive side channel attacks typically involve performing an activity repeatedly in a short amount of time. In an attack, the information cycle can be the same every time or different. Typical repetitive attacks can be performed, for example, 1000-10,000 or more times per second. This repetitive information cycle can be observed using an oscilloscope and the fluctuations in voltage or current can be noted either at the power pins or at a point of interest within the smart card using a probing device. This analysis of the smart card can allow an attacker to deduce the secret key based upon the known arithmetic operations within the algorithm and the value of the input text.

A repetitive SCA countermeasure described herein can identify when too many access attempts have been made in a fixed amount of time (even with system resets), indicating abnormal use. Additionally, a repetitive SCA countermeasure described herein can identify when too many attempts have been made using the same information cycle of input data. Once identified, the smart card or other computing device can enter into a protective mode, a completely broken card mode, or initiate some other security action to stop the extraction of information.

Figure 2:
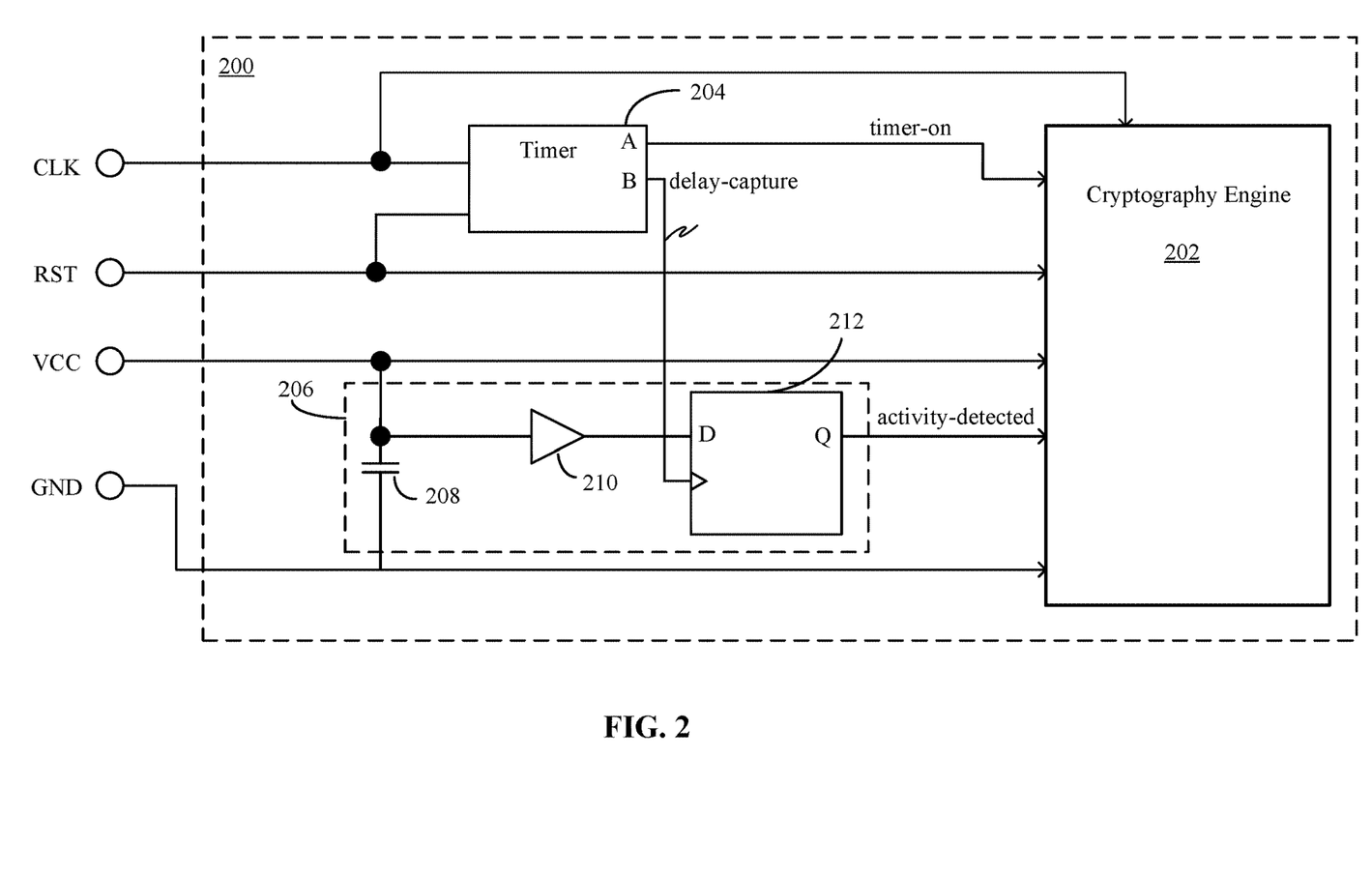
FIG. 2 shows an example hardware implementation of a repetitive SCA countermeasure using a capacitive delay.

FIG. 2 shows an example hardware implementation of a repetitive SCA countermeasure using a capacitive delay. As mentioned above, a repetitive SCA countermeasure using a capacitive delay can include a timer circuit coupled to a clock signal pin and a reset signal pin; and a capacitive delay circuit coupled to a power signal pin and a ground signal pin, wherein the timer circuit receives a clock signal from the clock signal pin and a reset signal from the reset signal pin and outputs a delay-capture signal to the capacitive delay circuit, wherein the capacitive delay circuit receives a power signal from the power signal pin, a ground signal from the ground signal pin, and the delay-capture signal from the timer circuit, and outputs an activity-detected signal to a computation engine of a computing device. Referring to the specific smart card implementation example of FIG. 2, a smart card 200 can include a cryptography engine 202, a timer circuit 204, and a capacitive delay circuit 206. The timer circuit 204 is coupled to a clock signal pin (CLK) and a reset signal pin (RST) of the smart card 200. The timer circuit 204 receives a clock signal from the clock signal pin and a reset signal from the reset signal pin and outputs a delay-capture signal to the capacitive delay circuit 206. The pins may receive the clock and reset signals from a card reader or test jig in which the smart card 200 is inserted.

The capacitive delay circuit 206 is coupled to a power signal pin (VCC) and a ground signal pin (GND) of the smart card 200. The capacitive delay circuit 206 receives a power signal from the power signal pin, a ground signal from the ground signal pin, and the delay-capture signal from the timer circuit 204, and outputs an activity-detected signal to the cryptography engine 202. The power and ground signals can be received from a card reader or test jig in which the smart card 200 is inserted. In some cases, an "enable" switch can be included between the power signal pin and the capacitive delay circuit 206 that is controlled by an attack-detect enable signal that is set if the countermeasure is to be used and cleared otherwise. Capacitive delay circuit 206 can include a capacitor 208, an amplifier 210, and a latch or flip-flop gate 212. The capacitor 208 is coupled to the power signal pin (VCC) and the ground signal pin (GND). For implementations with the enable switch, the enable switch can be between the power signal pin and the capacitor 208. The amplifier 210 is coupled to the capacitor 208 to sense the charge on the capacitor 208. The amplifier can be a high-gain amplifier and amplify the charge (e.g., voltage magnitude) sensed on the capacitor 208, capturing the state of the capacitor and sets the latch or flip flop gate 212 after the capacitor 208 has charged to a threshold level. The latch or flip flop gate 212 is coupled to the amplifier 210 to receive an output of the amplifier 210 and is coupled to the timer circuit 204 to receive the delay-capture signal. An output of the latch or flip-flop gate 212 is coupled to the cryptography engine 202 to provide the activity-detected signal. The latch or flip-flop gate 212 can be a D flip-flop.

The cryptography engine 202 can include one or more processing cores and memory storage. The processing cores may be implemented using application specific integrated circuits (ASICs), field programmable gate arrays (FPGA), microprocessors or other hardware circuitry. Common cryptography algorithms implemented in the cryptography engine include AES, ECC, variations of DES, and RSA. The memory storage can include non-volatile memory (NVM) and volatile memory. Examples of NVM include flash memory, various read-only memories (ROM, PROM, EPROM, EEPROM), phase change memory, magnetic and ferromagnetic/ferroelectric memories (MRAM, FeRAM). Examples of volatile memory include random-access memories (RAM, DRAM, SRAM).

The illustrated smart card 200 can initiate a countermeasure response based on the activity-detected signal received by the cryptography engine 202, which can be the result of the smart card being powered for an amount of time longer than typical operation. A countermeasure response can then be initiated based on the activity-detected signal received by the cryptography engine 202. In some cases, the timer circuit 204 is coupled to the cryptography engine 202 to output a timer-on notification to the cryptography engine 202. The timer-on notification can be used by the cryptography engine 202 to signal to read the input from the capacitive delay circuit 206. An illustrative scenario is provided as follows.

Upon insertion of smart card 200 into a card reader (or test jig), the RST signal goes high and timer circuit 204 begins operation. Initially, upon first insertion or if a sufficient amount of time has lapsed since the previous insertion of smart card 200 in to the card reader or test jig, the charge on the capacitor 208 is minimal. Thus, when timer circuit 204 sends a delay-capture signal to flip-flop 212 to cause the flip-flop 212 to capture its input value, the latch or flip-flop gate 212 outputs a low value to the cryptography engine 202, which indicates that an attack has not (yet) been detected.

Capacitor 208 begins to charge after the smart card 200 is inserted into the card reader because of the power supplied to the card 200. As the capacitor 208 is charged, the amplifier 210 amplifies the signal (e.g., voltage magnitude) provided to the latch or flip-flop gate 212. Once the capacitor 208 charges to a value above a threshold, the input to the latch or flip-flop gate 212 may switch to a high value. The next time timer circuit 204 sends a delay-capture signal to the latch or flip-flop gate 212 to cause the latch or flip-flop gate 212 to capture its input state, the input state will be high. In this state, the latch or flip-flop gate 212 will output a high activity-detected value to alert cryptography engine 202 that an attack is underway.

As mentioned above, when the timer circuit further provides a timer-on notification, the cryptography engine (or specified control portion of the smart card) can read the value output by the latch or flip-flop gate 212.

The size/capacitance of the capacitor can be selected to support a delay of an amount of time (e.g., time to charge to a threshold level), for example, 3-5 seconds. If access to the smart card 200 is requested within a few seconds of a prior access, or a prior reset operation, the charge on the capacitor continues to charge and is sufficient to cause the output of the latch or flip-flop gate 212 to be high, which when read by the cryptography engine (or specified control portion of the smart card), can be used to initiate a countermeasure. If the capacitor 208 is sufficiently discharged, the state of the latch or flip-flop gate 212 is low, and the output of the flip-flop is low, indicating no attack by this SCA method (and the access was safe).

The particular countermeasure implemented can be to obfuscate or alter the data in some manner as determined by the smart card designer. For example, the smart card can be disabled, performing no response to the input data, or can be switched from performing a proper response to performing an improper response. An improper response refers to the responses intended to create power signatures which are indicative of a different key or a random key.

Incorporating the capacitive delay circuit into a smart card can cost an attacker approximately 80 times more time to capture the data needed to extract the keys through a SCA such as differential power analysis (DPA). In addition, by increasing the discharge time of the capacitor, the amount of time needed to extract the keys during an attack directly increases.

In another embodiment of the repetitive SCA countermeasures described herein, one or more comparators can be used. The repetitive SCA countermeasure can include counting the number of times the same information cycle has been received by the smart card. Receiving the same information cycle repetitively can indicate an attack.

Figure 3:
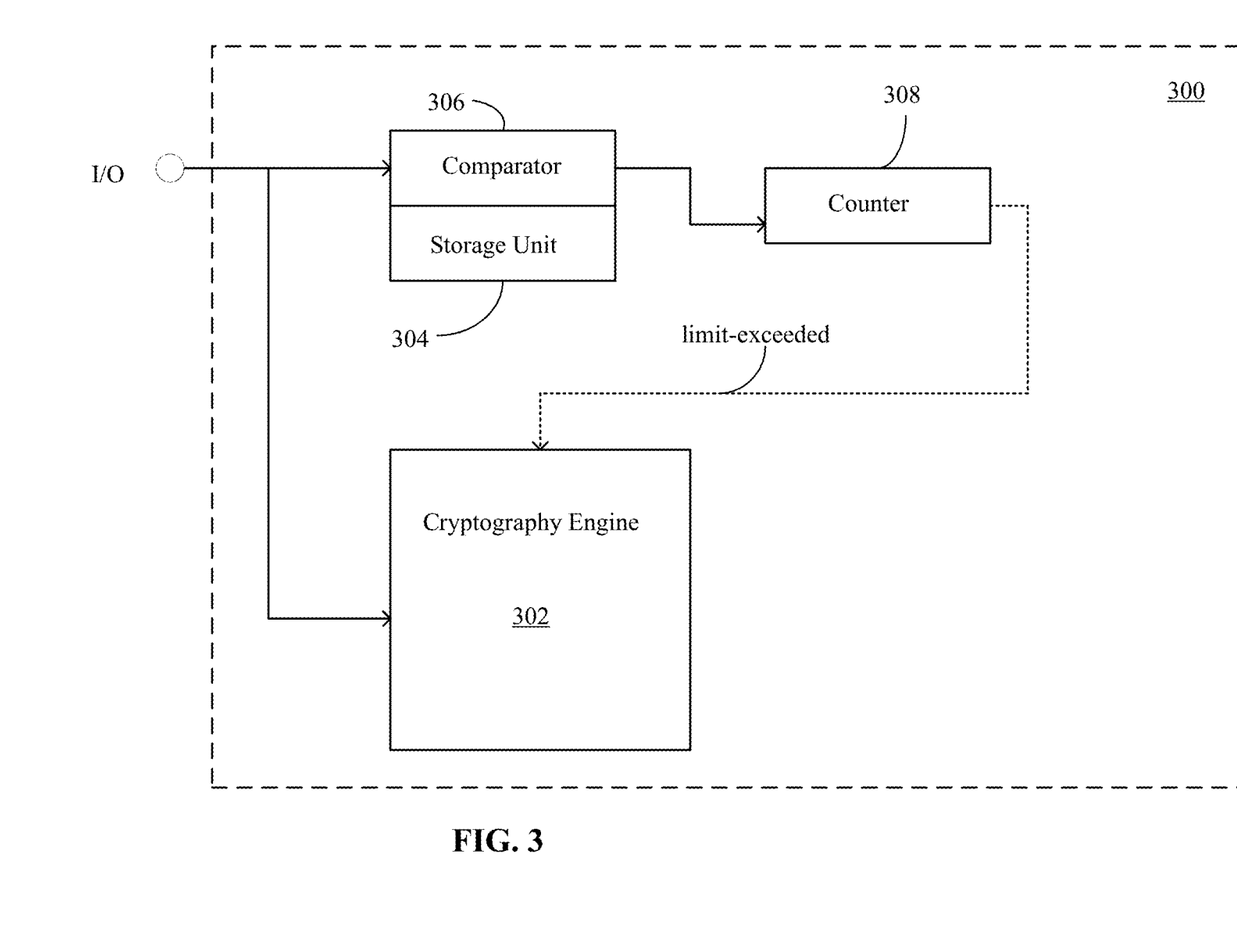
FIG. 3 shows an example implementation of a repetitive SCA countermeasure using a comparator.

FIG. 3 shows an example implementation of a repetitive SCA countermeasure using a comparator. As mentioned above, a repetitive SCA countermeasure using a comparator can include one or more comparators coupled to an I/O pin of a computing device; a storage unit coupled to each comparator; and a counter coupled to receive an output of the comparator, an output of the counter being coupled to a computation engine to provide a limit-exceeded signal to the computation engine. Referring to the specific smart card implementation example of FIG. 3, a smart card 300 can include a cryptography engine 302, a storage unit 304, a comparator 306, and a counter 308. The storage unit 304 can be a register, such as a first-in-first-out (FIFO) register, or suitable non-volatile memory (NVM). The storage unit has a size to store an information cycle received via the I/O pin. Although specific reference is made to the described countermeasure being applied to a smart card, the circuitry is applicable to any computing device that may be subject to a repetitive attack via a signal line.

Comparator 306 can receive one complete information cycle at a time from the I/O pin and can output a signal indicating a match. The information cycle can be a block of data of predetermined length, for example, 64 bits. In some cases, the comparator is a 64-bit comparator. In some cases, the comparator includes a plurality of smaller comparators, each able to handle a certain number of bits of the block of data for an information cycle. Storage unit 304 is coupled to comparator 306 and stores the previously-received information cycle. Storage unit 304 may be part of the memory storage within cryptography engine 302, part of other memory storage on the smart card 300, or a separate storage on the smart card 300. Comparator 306 compares the previously stored information cycle in the storage unit 304 to the newly-received information cycle. Counter 308 will increment if the comparator outputs a signal indicating that the newly-received information cycle matches the previously stored information cycle.

In FIG. 3, the smart card 300 may receive input data via an I/O pin such as described with respect to FIGS. 1A and 1B. The input data can include information cycles representing input data such as, but not limited to, plaintext or ciphertext. When a smart card is inserted into a card reader or test jig (or other device), an exchange of information cycles begins. The smart card 300 can detect whether a newly-received information cycle is a repetitive transmission of a previous information cycle using the described countermeasure circuitry.

A single match between the newly-received information cycle and the previously stored information cycle does not necessarily indicate an attack. The smart card designer can determine how many repetitive information cycles are acceptable before implementing a countermeasure. For example, an attack may be considered likely if there have been more than 3 repetitive information cycles since the last reset. If the counter 308 exceeds the predetermined level of acceptability, the counter (or other circuitry coupled to the counter) can output limit-exceeded signal to the cryptography engine 302 to indicate an attack. The limit-exceeded signal can be used to generate an abort, interrupt, or halt signal. Similar to the example embodiment in FIG. 2, the countermeasure can include obfuscating or altering the data in some manner as determined by the smart card designer, shutting down the device, or other countermeasure.

The number of comparators and storage units used in a smart card can vary based on the expected sophistication of potential attackers. For example, an attacker may learn that the smart card is disabled after 3 attempts to send the same information cycle. The attacker may begin sending a pattern of two repetitive information cycles followed by a different information cycle to access the smart card, referred to herein as a "multi-input" repetitive attack.

Figure 4A:
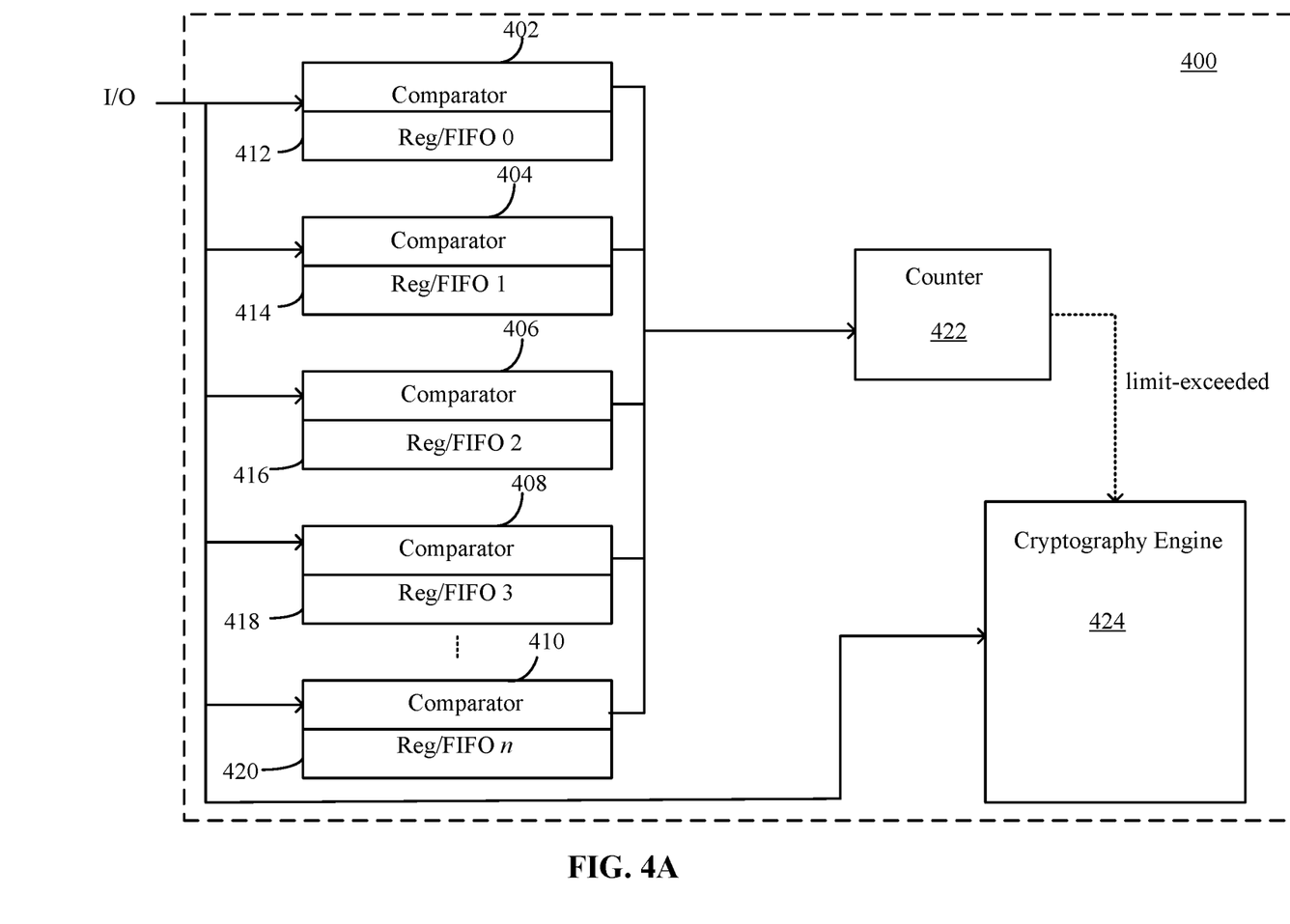
FIGS. 4A and 4B show example implementations of a repetitive SCA countermeasure suitable for multi-input repetitive attack.
Figure 4B:
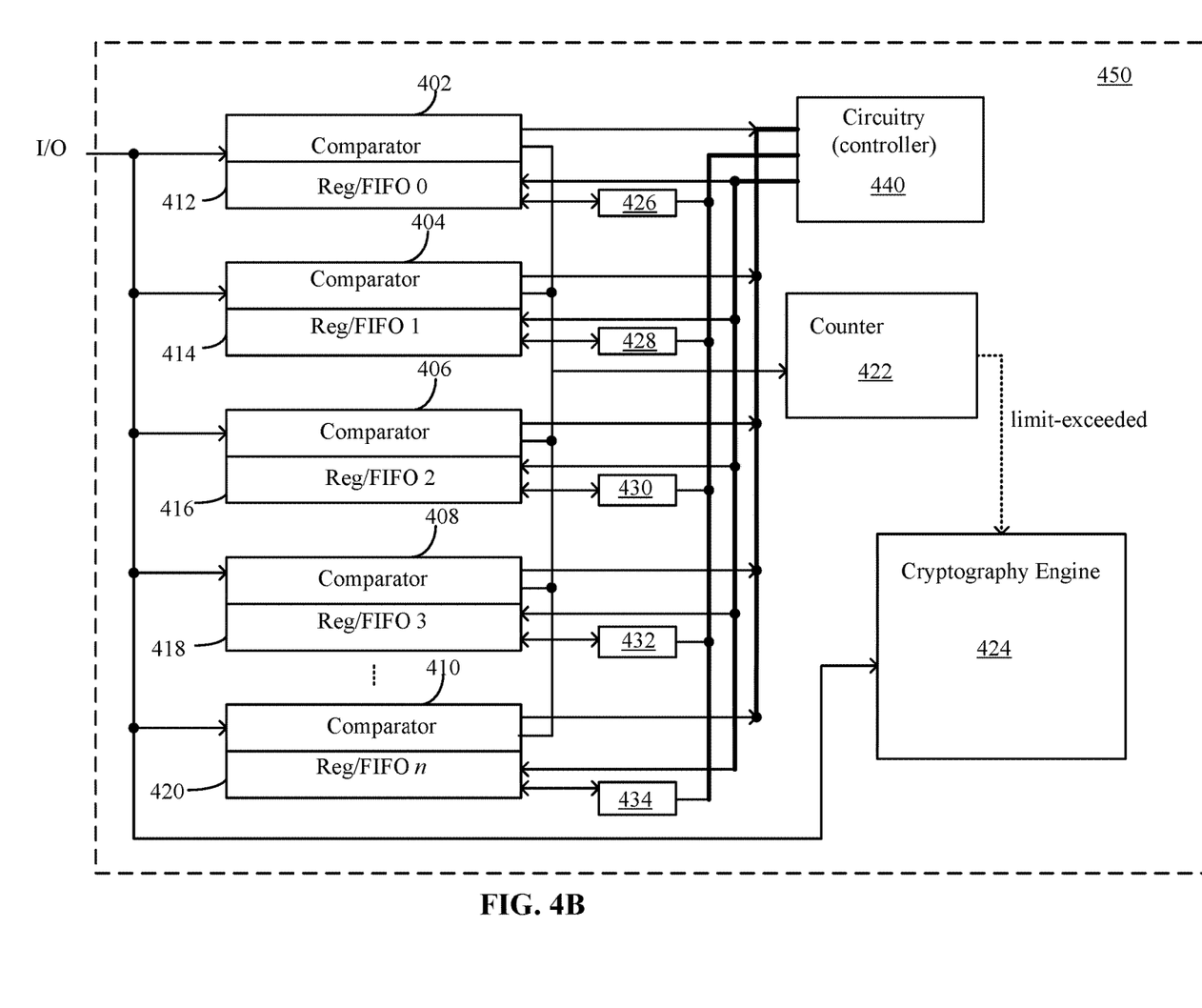

FIGS. 4A and 4B show example implementations of a repetitive SCA countermeasure suitable for multi-input repetitive attack. Although reference is specifically made to smart cards, the example implementations of a repetitive SCA countermeasure shown in FIGS. 4A and 4B are applicable to any computing device receiving input and subject to multi-input repetitive attacks. Referring to FIG. 4A, a smart card 400 can include a plurality of comparators and storage units, for example n comparators (402, 404, 406, 408, 410) coupled to n corresponding storage units (412, 414, 416, 418, 420). Each comparator can receive an information cycle block and output an activity-detected signal to a counter 422. The counter 422 is coupled to receive the outputs from each comparator and output a limit-exceeded signal to a cryptography engine 424.

As described with respect to FIG. 3, the storage units (e.g., 412, 414, 416, 418, 420) can be registers, such as a D-type register, or suitable non-volatile memory (NVM). Each storage unit has a size to store an information cycle received via the I/O pin. In addition, in some cases, the comparator is a 64-bit comparator. In some cases, the comparator includes a plurality of smaller comparators, each able to handle a certain number of bits of the block of data for an information cycle. The plurality of storage units (e.g., 412, 414, 416, 418, 420) may be part of the memory storage within cryptography engine 424, part of other memory storage on the smart card 400, or a separate storage on the smart card 400. Each comparator (e.g., 402, 404, 406, 408, 410) compares the previously stored information cycle in the storage unit (e.g., 412, 414, 416, 418, 420) associated with that comparator to the newly-received information cycle. Counter 422 will increment if any of the comparators output a signal indicating that the newly-received information cycle matches the previously stored information cycle.

Each comparator of the n comparators (402, 404, 406, 408, 410) can receive a complete information cycle from the I/O pin. In some cases, the comparators are connected in series and the comparators are filled with incoming information cycles similar to first-in-first-out operation before performing the comparison operation. In some cases, the comparators are connected in parallel such that the incoming information cycles are directed to appropriate comparators before performing the comparison. Either configuration may be operated such that not all comparators are filled and used in a comparison during operation.

In some cases, more than one counter may be used; and the value for the limit given to the counter taking the configuration into consideration.

Referring to FIG. 4B, the countermeasures included in smart card 450 can be similar to those described with respect to smart card 400 FIG. 4A, but includes circuitry 440 that directs the appropriate input data to be stored in the storage units. The circuitry 440 is coupled to each comparator (402, 404, 406, 408, 410) to receive the output of that comparator of a comparison between a received input data of an information cycle and input data stored in the corresponding storage unit (412, 414, 416, 418, 420); and if the output of that comparator indicates no match, store that received input data in a selected one of the storage units.

Within Counter 422 can be a set of counters, each corresponding to one of the comparators. A single match between the newly-received information cycle and the previously stored information cycle does not necessarily indicate an attack. The smart card designer can determine how many repetitive information cycles are acceptable before implementing a countermeasure. For example, an attack may be considered likely if there have been more than 3 repetitive information cycles since the last reset. If the counter 422 exceeds the predetermined level of acceptability (over all counters or by a single counter within counter 422), the counter (or other circuitry coupled to the counter) can output a limit-exceeded signal, such as described with respect to FIG. 3, to the cryptography engine 424 to indicate an attack; and an appropriate countermeasure can be taken. In some cases, no countermeasure is taken in response to the limit-exceeded signal. For example, a countermeasure may be taken upon receipt of a certain number of limit-exceeded signals.

In some cases, the circuitry 440 can determine whether any storage units (412, 414, 416, 418, 420) are not storing prior input data; if all the storage units are all storing prior input data, the circuitry 440 can select a random storage unit of the plurality of storage units and load the received input data of the information cycle to the random storage unit; and if any of the storage units are not storing prior input data can select one of the empty storage units and load the received input data of the information cycle to an empty storage unit. The selection of an empty storage unit may be at random, according to a predetermined pattern, or sequential. In some cases when all the storage units are storing prior input data, the circuitry 440 can select a storage unit according to a predetermined pattern instead of at random. In some cases, each of the n storage units (412, 414, 416, 418, 420) are coupled to a corresponding full/empty indicator device (426, 428, 430, 432, 434). The full/empty indicator devices can be coupled to the circuitry 440 to indicate whether the storage unit is empty of an information cycle or full of an information cycle.

Figure 5:
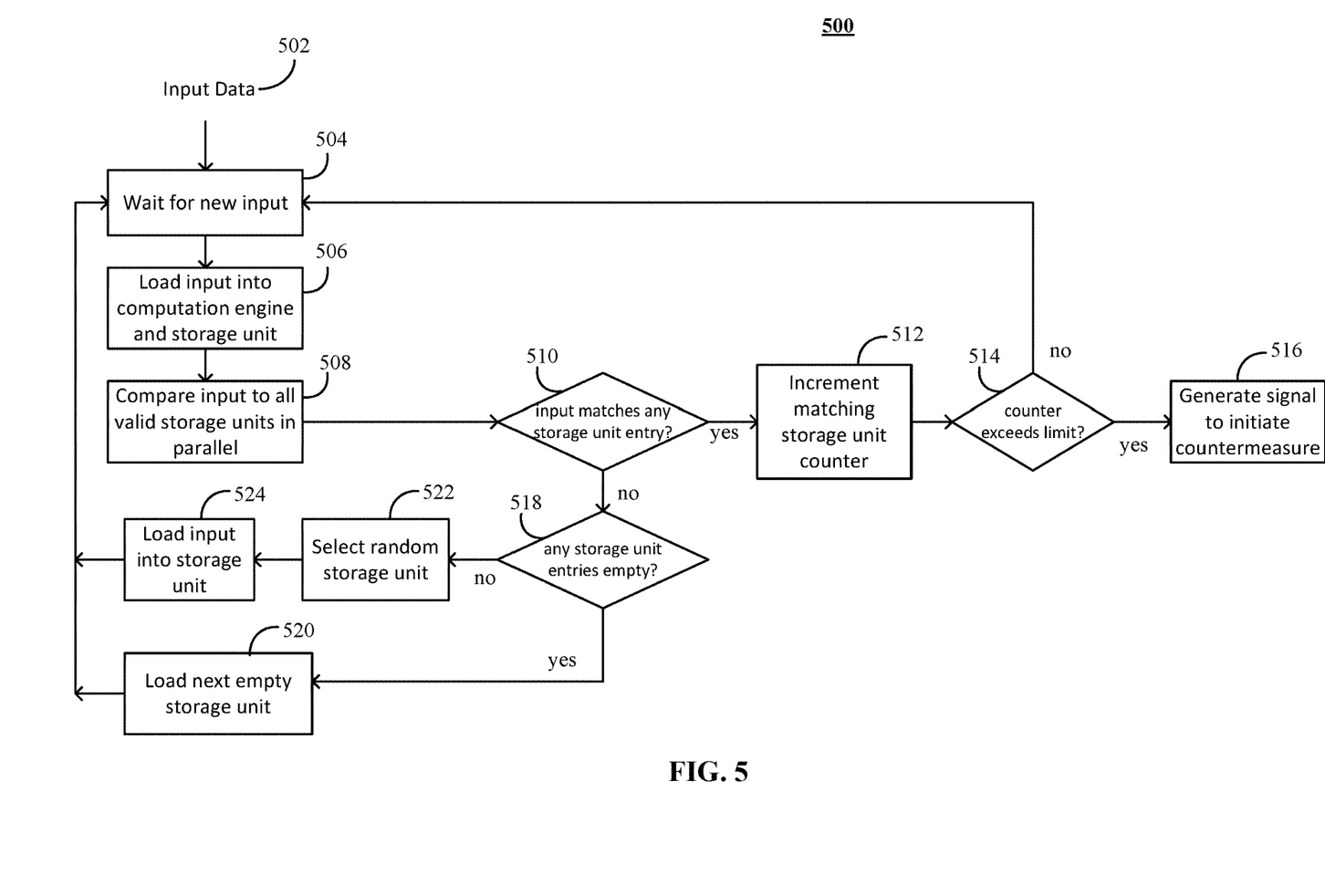
FIG. 5 shows a method that may be carried out by a repetitive SCA countermeasure using one or more comparators.

FIG. 5 shows a method that may be carried out by a repetitive SCA countermeasure using one or more comparators. Method 500 may be carried out by any computing device incorporating repetitive SCA countermeasure. In some cases, the method 500 illustrated in FIG. 5 may be carried out by a smart card such as described with respect to smart cards 300, 400, and 450 of FIGS. 3, 4A, and 4B. The described repetitive SCA countermeasure can begin when data is first input into the smart card (or other computing device) using, for example, an I/O connection pin (502). The smart card can be in a waiting state until the new input is received (504). Once new input is received, the new input is loaded into both the computation engine (e.g., cryptography engine) and a storage unit (506). Next, the input data is compared to all valid (i.e., non-empty) storage units (508). This step can occur in a parallel process in which the input data can be compared to all valid storage units at the same time—whether there is a single storage unit such as described with respect to smart card 300 or a plurality of storage units such as described with respect to smart cards 400 and 450.

When the input data matches any data already stored in any valid storage unit (510), a counter will increment (512). The counter can be checked to see if the number of matches exceeds a limit (514). If the number of matches does exceed the limit, a signal is generated to initiate a countermeasure (516). The signal can be an abort signal, an interrupt signal, or a signal to halt cryptographic operation, as some examples. If the number of matches does not exceed the limit (as determined during operation 514), the process can return to operation 504 to wait for new input.

If, during operation 510, the input data does not match any data already stored in any valid storage unit, then the smart card/computing device can check if there are any empty storage units (518). When there are empty storage units, the input data can be loaded into the next empty storage unit (520) and the process can next return to operation 504 to wait for new input. When there are no empty storage units, a storage unit can be selected at random or by some predetermined pattern (522) and the input data can be loaded into the selected storage unit (524). The process can then return to operation 504 to wait for new input.

In some cases, the one or more comparators and/or the method 500 itself may be implemented in software stored on a computing device and executed by a processor of the computing device. For example, the computer-implemented method can include receiving an input data of an information cycle; comparing the input data to one or more prior input data; incrementing a counter when the input data matches any of the one or more prior input data; and upon the counter reaching or exceeding a limit, generating a signal to initiate a repetitive SCA countermeasure. In some cases, the method further includes, when the input data of the information cycle does not match any of the prior input data, checking if there are empty storage units; and when there are empty storage units, loading the input data into a next empty storage unit and when there are no empty storage units, selecting a storage unit and loading the input data into the selected storage unit. The selecting of the storage unit can include randomly selecting one of a plurality of storage units. For example, a selected storage unit can be selected using a random number generator to generate the selection pattern). In some cases, the selected storage unit can be selected according to a predetermined pattern.

Figure 6:
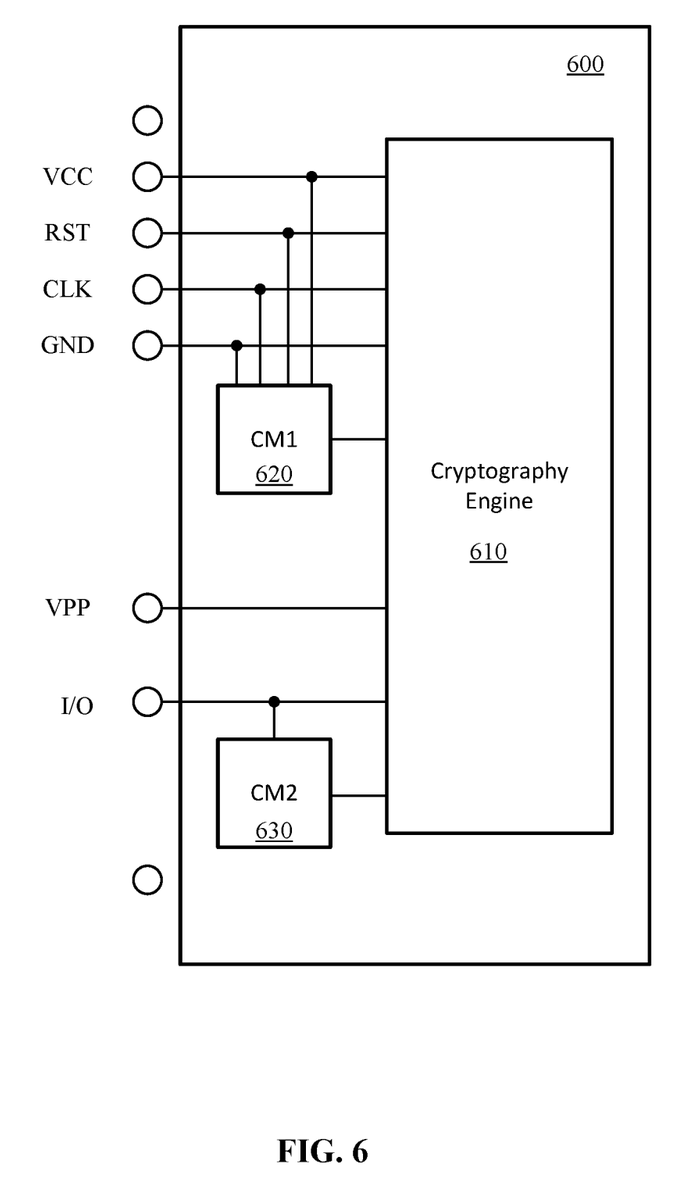
FIG. 6 shows a representational diagram of a smart card implementing repetitive SCA countermeasures.

FIG. 6 shows a representational diagram of a smart card implementing repetitive SCA countermeasures. Referring to FIG. 6, a smart card chip 600 can include a cryptography engine 610 and pads for VCC (power supply input), RST (can be used by itself or in combination with an internal reset control circuit), CLK (clocking or timing signal), GND (ground—a ground or VSS signal), VPP (programming voltage input), I/O (input or output for serial data to the microcontroller inside the smart card), and optionally two additional connection pads for application specific inputs (or outputs) or future standards, as described with respect to FIGS. 1A and 1B. Smart card chip 600 can include multiple SCA countermeasures, including countermeasure 1 (CM1) 620 and countermeasure 2 (CM2) 630. CM1 620 may provide a repetitive SCA countermeasure using a capacitive delay such as described with respect to FIG. 2, including a timer circuit and a capacitive delay circuit. CM2 630 may provide a repetitive SCA countermeasure using one or more comparators such as described with respect to FIGS. 3-5. One or both countermeasures may be enabled for a particular chip.

Although smart cards and cryptography engines are specifically described and illustrated herein, some of the described SCA countermeasures can be applied to any computing device that receives signals such as a clocking or timing signal, a reset signal, a ground signal, and a power supply input signal. In addition, some of the described SCA countermeasures can be applied to any computing device that receives input signals that are input in information cycles.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A computing device comprising:
    a comparator coupled to an I/O pin of the computing device for detecting repetitive input signals;
    a storage unit coupled to the comparator for storing a representative input signal, wherein the comparator compares an input received via the I/O pin to the representative input signal stored in the storage unit to determine whether the input matches the representative input signal, wherein the representative input signal stored in the storage unit is a prior incoming signal received via the I/O pin; and
    a counter coupled to receive an output of the comparator, wherein the counter increments upon the comparator indicating that the input matches the representative input signal indicating a repetitive input signal, wherein an output of the counter is coupled to a computation engine to provide a limit-exceeded signal to the computation engine when the counter exceeds a predetermined level of acceptability for repetitive input signals.

2. The computing device of claim 1, wherein the computing device is a smart card.

3. The computing device of claim 1, wherein the computation engine comprises a cryptography engine.

4. The computing device of claim 1, further comprising:
a timer circuit coupled to a clock signal pin and a reset signal pin of the computing device; and
    a capacitive delay circuit coupled to a power signal pin and a ground signal pin of the computing device, and further coupled to the computation engine to provide an activity-detected signal.

5. The computing device of claim 4, wherein the capacitive delay circuit comprises:
    a capacitor coupled to the power signal pin and the ground signal pin, an amplifier coupled to the capacitor to sense a charge on the capacitor, and a latch or flip-flop gate coupled to the amplifier to receive an output of the amplifier and coupled to the timer circuit to receive a delay-capture signal output from the timer circuit, wherein an output of the latch or flip-flop gate is coupled to the computation engine to provide the activity-detected signal.

6. The computing device of claim 1, wherein the storage unit stores the representative input signal of a first information cycle received via the I/O pin and the comparator receives a second information cycle received via the I/O pin to compare the second information cycle with the first information cycle.

7. The computing device of claim 1, wherein the comparator is a 64-bit comparator.

8. The computing device of claim 1, further comprising:
a plurality of comparators; and
a corresponding plurality of storage units.

9. The computing device of claim 8, further comprising:
a corresponding plurality of counters coupled to the plurality of comparators.

10. The computing device of claim 8, further comprising circuitry that directs appropriate input data to be stored in the storage unit and the corresponding plurality of storage units.

11. The computing device of claim 10, wherein the circuitry is coupled to each comparator to receive the output of that comparator of a comparison between a received input data of an information cycle and input data, including the representative input signal stored in the corresponding storage unit for that comparator; and when the output of that comparator indicates no match, determine whether any storage units are not storing prior input data;

when all the storage units are all storing prior input data, select a random storage unit of the plurality of storage units and load the received input data of the information cycle to the random storage unit; and when any of the storage units are not storing prior input data, load the received input data of the information cycle to a next empty storage unit.

12. The computing device of claim 11, further comprising a full/empty indicator device coupled to each of the storage units, the circuitry being coupled to the full/empty indicator devices.

13. A computer-implemented method comprising:
receiving, at a comparator coupled to an I/O pin of a computing device for detecting repetitive input signals, an input data of an information cycle;

comparing, via the comparator, the input data to one or more prior input data stored at a storage unit coupled to the comparator to determine whether the input data matches the one or more prior input data, wherein the one or more prior input data stored in the storage unit is a prior incoming signal received via the I/O pin;

incrementing a number in a counter that is coupled to receive an output of the comparator when the input data matches any of the one or more prior input data indicating a repetitive input signal, wherein the number in the counter represents a number of matches, wherein an output of the counter is coupled to a computation engine to provide a limit-exceeded signal to the computation engine when the counter exceeds a predetermined level of acceptability for repetitive input signals; and upon the counter reaching or exceeding a limit corresponding to the predetermined level of acceptability for repetitive input signals, generating a signal to initiate a repetitive SCA countermeasure.

14. The method of claim 13, further comprising:
when the input data of the information cycle does not match any of the prior input data, checking if there are empty storage units; and when there are empty storage units, loading the input data into an empty storage unit and if there are no empty storage units, selecting a storage unit and loading the input data into the selected storage unit.

* * * * *